United States Patent [19]
Liubakka

[11] Patent Number: 5,900,591
[45] Date of Patent: May 4, 1999

[54] HYDRAULIC ACTUATED BELT SCALE CALIBRATION SYSTEM

[76] Inventor: Gary M. Liubakka, 2624 Third Ave. East, Hibbing, Minn. 55746

[21] Appl. No.: 08/852,069

[22] Filed: May 6, 1997

Related U.S. Application Data

[63] Continuation-in-part of application No. 08/668,939, Jun. 24, 1996, abandoned.

[51] Int. Cl.$^6$ ...................................................... G01G 19/52
[52] U.S. Cl. .............................................. 177/50; 73/1.13
[58] Field of Search .............................. 177/50, 119, 141, 177/147; 73/1.13, 1.15

[56] References Cited

U.S. PATENT DOCUMENTS 4,722,407  2/1988  Gindy et al. ............................... 177/50

OTHER PUBLICATIONS

*Calculus with Analytic Geometry*, Munem et al., Worth Publishers, Inc. New York, N.Y. pp. 337–338, 1978.

*Primary Examiner*—Randy W. Gibson
*Attorney, Agent, or Firm*—Kinney & Lange, P.A.

[57] ABSTRACT

A belt scale calibration system for calibrating a belt scale that is mounted with respect to a conveyor belt. The belt scale calibration system includes a load inducing assembly and a load induced assembly. The load inducing assembly engages the conveyor belt proximate to the belt scale. The load induced assembly is operably connected to the load inducing assembly. Applying a force to the load induced assembly produces a force on the load inducing assembly which the load inducing assembly transmits to the conveyor belt for calibrating the belt scale.

20 Claims, 5 Drawing Sheets

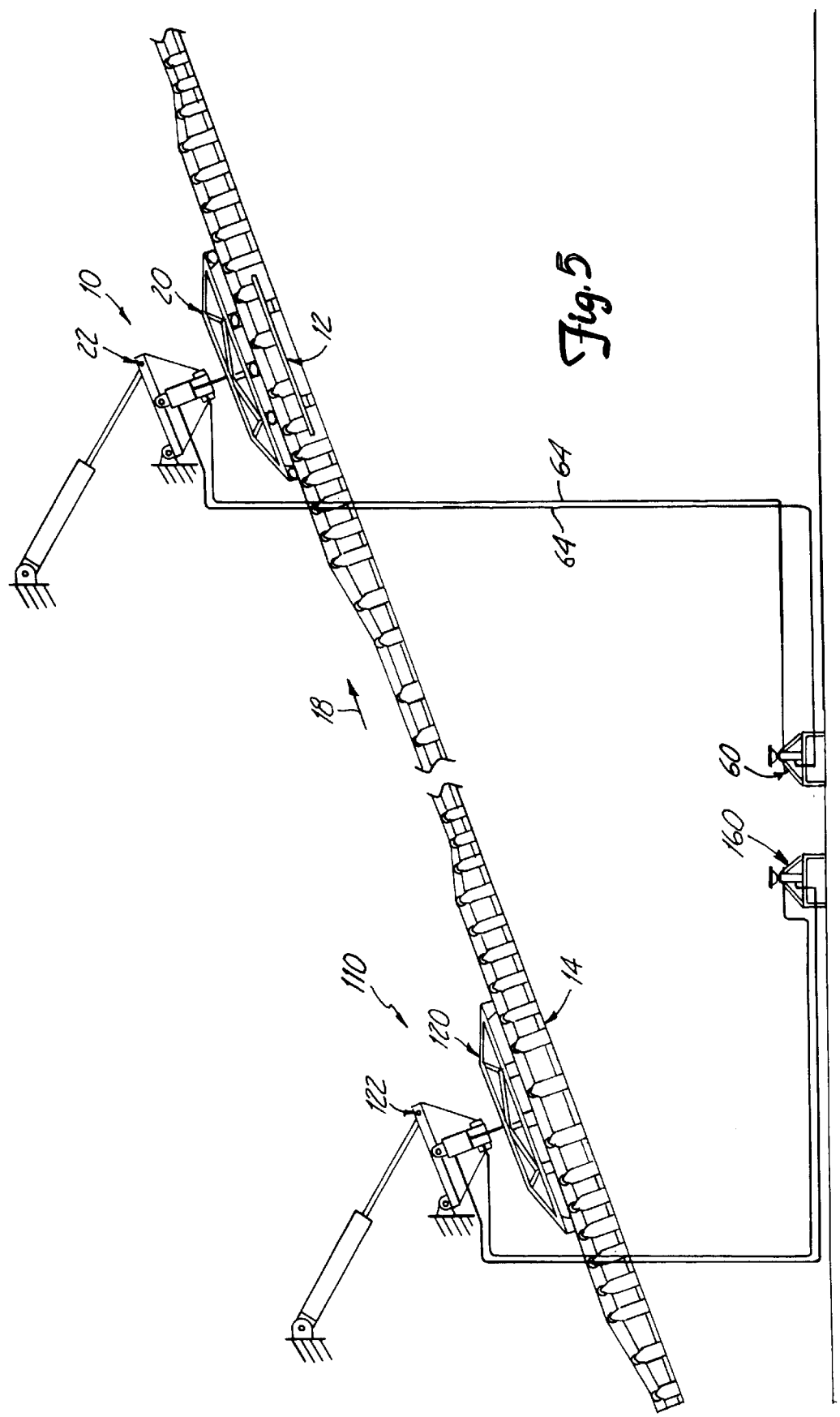

HYDRAULIC ACTUATED BELT SCALE CALIBRATION SYSTEM

This application is a continuation in part of application Ser. No. 08/668,939, filed on Jun. 24, 1996 now abandoned.

BACKGROUND OF THE INVENTION

The present invention relates generally to a system for calibrating scales. More particularly, the present invention relates to a system for calibrating belt scales.

In conjunction with the sale of many types of bulk materials, it is necessary to weigh the bulk materials to ensure the accuracy of the amount of bulk materials being sold. When very large amounts of bulk materials are sold, such as in ore mining operations, it is typically not possible to place the bulk materials onto a stationary scale for weighing. Conveyor belt scales have been developed for these circumstances that permit the bulk materials to be weighed as the bulk materials are transported on a conveyor belt.

When belt scales are used, it is typically necessary to perform periodic calibrations of the belt scale to ensure that the weight indicated by the belt scale is actually correct. In certain industries, calibration of belt scales is required by law.

One technique for calibrating a conveyor belt scale involves passing a known amount of material over the conveyor belt scale to verify the accuracy of the conveyor belt scale. To verify the accuracy of the belt scale at various weights, it is necessary to run several tests at multiple weights.

One common method of calibrating conveyor belt scales involves placing an accurately weighted length of a roller chain on the conveyor belt and then passing the roller chain over the belt scale. One drawback of this technique is that the weight of the roller chain cannot be varied. As such, the roller chain only ensures accuracy of the conveyor belt scale at the tested weight. Additionally, the roller chains must be calibrated on a yearly basis.

For example, Blubaugh, U.S. Pat. No. 3,396,573, discloses an assembly that has a plurality of interconnected wheeled trucks that each have a known weight. The assembly is attached in a fixed position over the belt scale while the conveyor belt is moving beneath the assembly to calibrate the belt scale.

Jones, U.S. Pat. No. 2,974,518, describes a belt scale calibration system where weights are placed on an elongated frame. The force of the weight on the elongated frame is applied to the conveyor belt through a rotatable wheel. The weight measured by the belt scale is then compared to the weight on the elongated frame.

Wilson et al., U.S. Pat. No. 3,976,150, describes a structure for use in calibrating a belt scale. The Wilson et al. structure includes a frame that extends over the conveyor belt and which is mounted to the belt scale. Placing a known amount of weight on the frame allows the belt scale to be calibrated.

Karpa, U.S. Pat. No. 4,658,921, discloses an apparatus for calculating a stationary scale. The apparatus includes a frame mounted over the scale and a hydraulic press mounted to the frame for applying force to the scale.

McDonald, U.S. Pat. Nos. 3,656,337 and 3,850,023, describe a calibration system in which the conveyor belt is lifted off the belt scale and a calibration load is placed on the belt scale.

Laurent, U.S. Pat. No. 4,309,896, discloses a weighing system that includes at least one flexible body. The flexible body compresses in response to a force placed thereon. Compression of the flexible body causes hydraulic fluid to be transmitted to a pressure transducer. Laurent also discloses the use of smaller flexible body attached to the pressure transducer for calibrating the pressure transducer.

SUMMARY OF THE INVENTION

The present invention is a belt scale calibration system for calibrating a belt scale that is mounted with respect to a conveyor belt. The belt scale calibration system includes a load inducing assembly and a load induced assembly. The load inducing assembly engages the conveyor belt proximate to the belt scale. The load induced assembly is operably connected to the load inducing assembly. Applying a first force to the load induced assembly produces a second force on the load inducing assembly which the load inducing assembly transmits to the belt scale for calibrating the belt scale.

BRIEF DESCRIPTION OF THE DRAWINGS

FIG. 5 is a side view of another alternative embodiment of the belt scale calibration system.

DETAILED DESCRIPTION OF THE PREFERRED EMBODIMENTS

Figure 1:
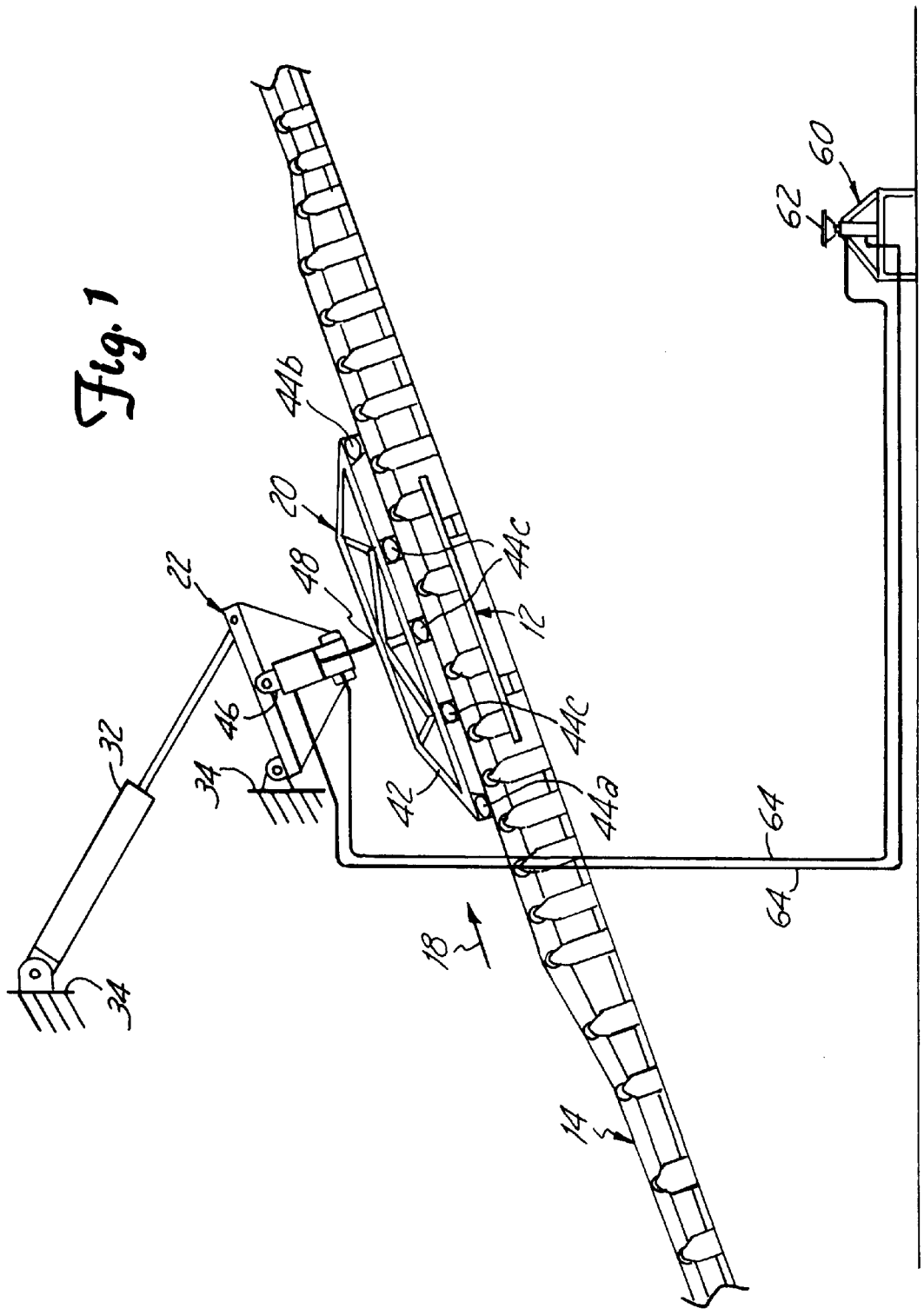
FIG. 1 is a side view of a belt scale calibration system according to the present invention.

The present invention is a belt scale calibration system, as most clearly illustrated at 10 in FIG. 1. The belt scale calibration system 10 is used for calibrating conveyor belt scale 12, which typically includes a plurality of load cells, that measure the amount of bulk material being transported on a conveyor belt 14. To assist in visualizing the operation of the present invention, a direction in which the conveyor belt 14 moves is referred to as the machine direction, which is indicated by arrow 18.

The belt scale calibration system 10 thereby ensures the accuracy of measurements provided by the belt scale 12 to protect both purchasers and sellers of bulk materials from incorrect measurements.

The belt scale calibration system 10 of the present invention has numerous advantages over prior art systems for calibrating belt scales. Namely, the present invention is adjustable to calibrate the belt scale 12 for various loads. Additionally, the belt scale calibration system 10 can be used for adjusting the alignment of the belt scale 12.

The belt scale calibration system 10 generally includes a load inducing assembly 20 and a support assembly 22 that mounts the load inducing assembly 20 with respect to the conveyor belt 14. The support assembly 22 enables the load inducing assembly 20 to be moved to an engaged position and a retracted position. When the support assembly 22 is in the engaged position, the load inducing assembly 20 engages the conveyor belt 14 so that the belt scale 12 can be calibrated. When the support assembly 20 is in the retracted position, the load inducing assembly 20 is away from the conveyor belt 14 so that the load inducing assembly 20 and the support assembly 22 do not interfere with the bulk material that are transported on the conveyor belt 14.

The support assembly 22 preferably includes a mounting frame 30 and a retraction mechanism 32. The mounting frame 30 is preferably pivotally mounted with respect to a wall 34 or other structure that is maintained in a stationary relation with respect to the conveyor belt 14. The retraction mechanism 32 is attached to both the mounting frame 30 and the wall 34 and thereby allows the mounting frame 30 to be pivoted with respect to the wall 34. Preferably, the retraction mechanism 32 is a hydraulic cylinder.

Figure 2:
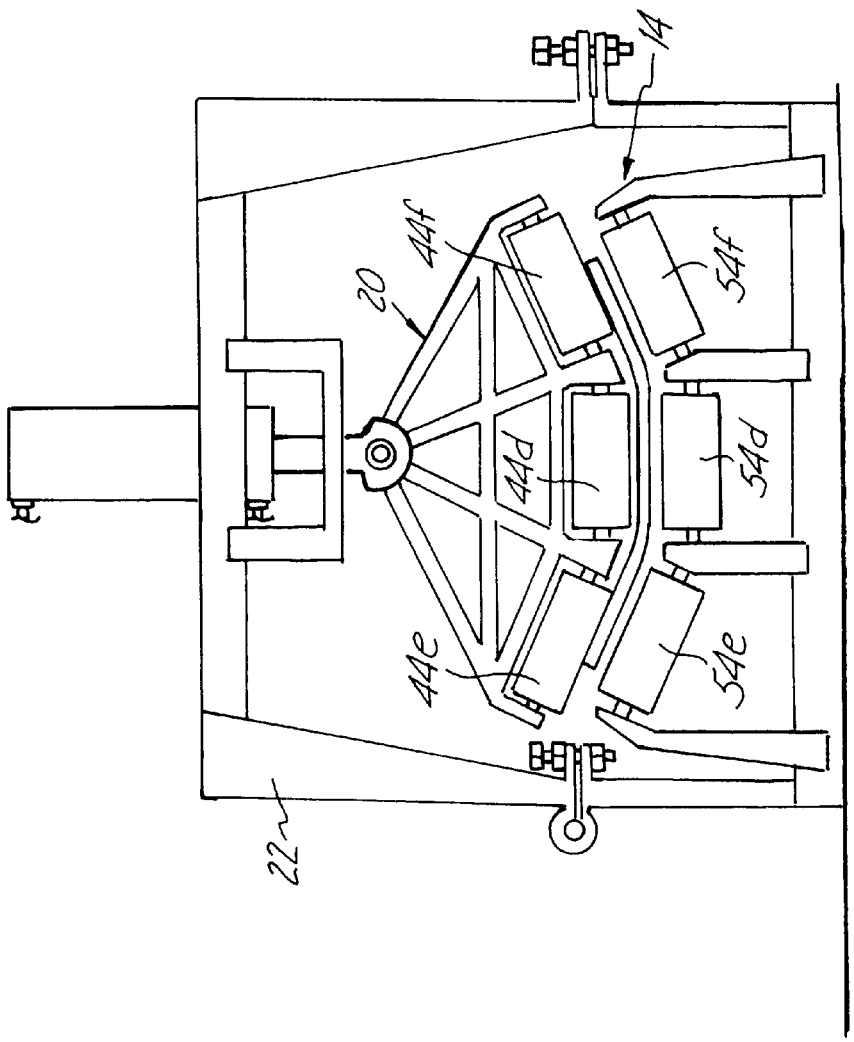
FIG. 2 is a sectional view of an alternative embodiment of the belt scale calibration system in an engaged position.
Figure 3:
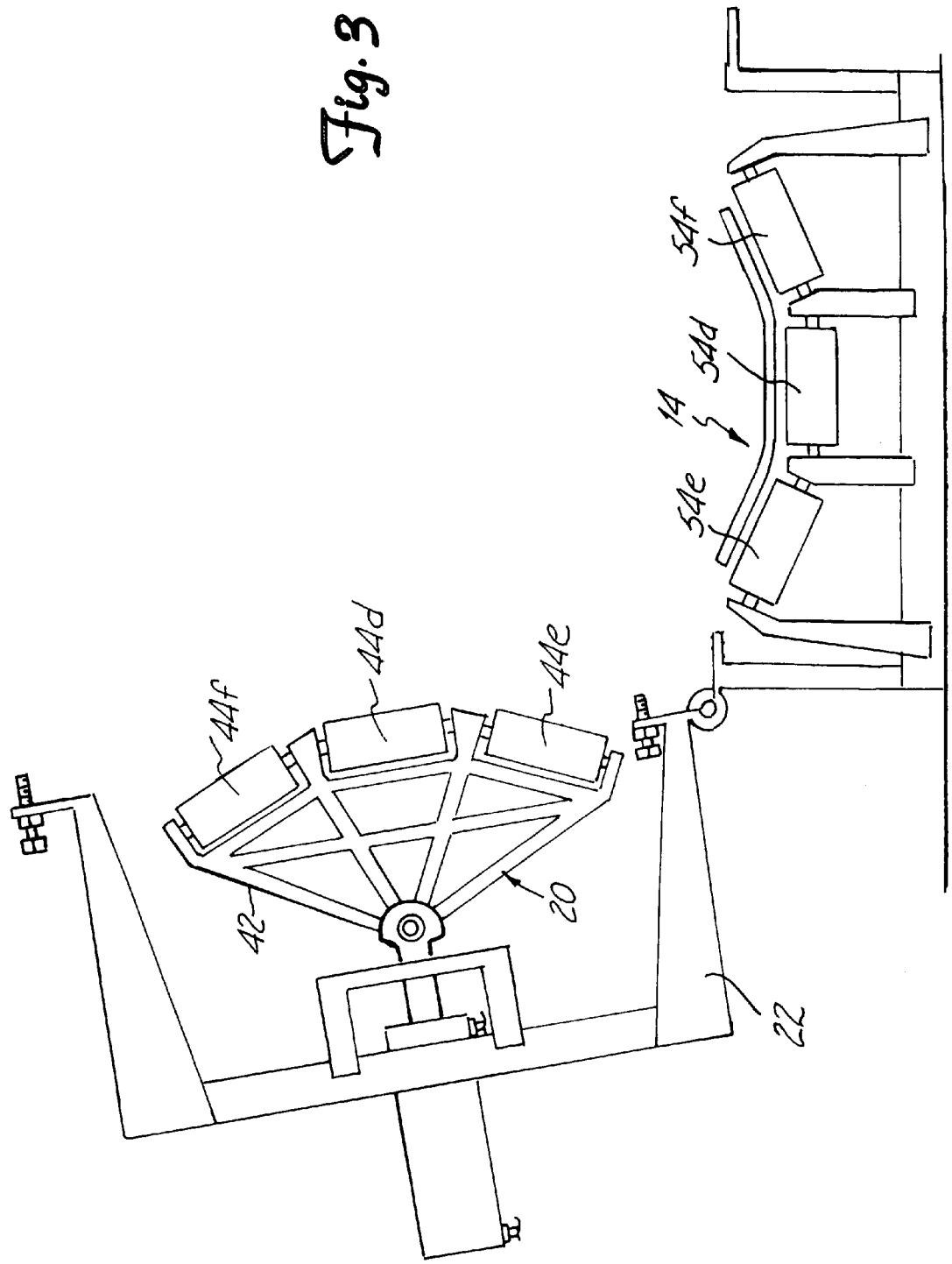
FIG. 3 is a section view of the alternative embodiment of the belt scale calibration system in a retracted position.

As an alternative to pivoting the support assembly 22 upwardly away from the conveyor belt 14 along an axis that is perpendicular to the machine direction 18, as illustrated in FIG. 1, the support assembly 22 may be pivoted along an axis that is parallel to the machine direction 18, as illustrated in FIGS. 2 and 3.

The load inducing assembly 20 preferably includes a load inducing cylinder 40, a support frame 42, and a plurality of rollers 44, as most clearly illustrated in FIG. 1. A first end 46 of the load inducing cylinder 40 is mounted to the mounting frame 30 and thereby pivots with the mounting frame 30 as the mounting frame 30 is pivoted between the engaged position and the retracted position. The support frame 42 is attached to a second end 48 of the load inducing cylinder 40.

The plurality of rollers 44 includes a front roller 44a and a back roller 44b. The front roller 44a and the back roller 44b are preferably attached to the support frame 42 so that the front roller 44a and the back roller 44b are aligned in series along the machine direction 18. Additionally, the front roller 44a is located before the belt scale 14 and the back roller 44b is located after the belt scale 14. Positioning the cylindrical rollers 44 in these locations allows the belt scale calibration system 10 to simulate the loading on the belt scale 14 by bulk material.

When configuring the placement of the cylindrical rollers 44, the cylindrical rollers 44 should not be placed immediately above the belt scale load cells 12. Placement of the cylindrical rollers immediately above the belt scale load cells presents problems that are caused by point loading.

Depending on the length of the belt scale 14, it may also be desirable to include at least one intermediate roller 44c. The intermediate rollers 44c help to more closely simulate the loading on the belt scale 14 by the bulk material.

To further enhance the ability of the belt scale calibration system 10 to simulate actual loading of the belt scale 14, the rollers are preferably formed with a length-wise cross section that corresponds with a cross section of the conveyor belt 14. For example, when the conveyor belt 14 is substantially flat, the roller has a substantially cylindrical profile. Alternatively, when the conveyor belt 14 has a concave profile, the roller has a profile where the diameter proximate to the ends is smaller than the diameter proximate to the middle.

Alternatively, a plurality of rollers 44d, 44e, 44f may be aligned in parallel along the machine direction 18, as most clearly illustrated in FIGS. 2 and 3. With this embodiment, the center roller 44d is aligned substantially perpendicular to a center roller 54d on the conveyor belt 14. Similarly, the outside rollers 44e, 44f are preferably aligned substantially perpendicular to the outside rollers 54e, 54f on the conveyor belt 14.

The load applied to the load inducing assembly 20 is preferably controlled by a load induced assembly 60. The load induced assembly 60 includes a load induced cylinder 62 that is operably connected to the load inducing cylinder 40. The load inducing cylinder 62 thereby allows a force produced by a known amount of weight to be transmitted to the load inducing cylinder 40.

A bore diameter of the load induced cylinder 62 is preferably significantly smaller than a bore diameter of the load inducing cylinder 40 to enable a relatively small weight applied to the load induced cylinder to produce a considerably larger load on the load inducing cylinder 40. For example, the ratio of the force applied to the load induced cylinder 62 to the load produced by the load inducing cylinder 40 may be on the order of 100:1.

The load induced cylinder 62 is preferably operably connected to the load inducing cylinder 40 with hydraulic fluid transfer lines 64. However, a person or ordinary skill in the art will appreciate that other mechanisms of operably connecting the load induced cylinder 62 and the load inducing cylinder 40 are also within the scope of the present invention.

Figure 4:
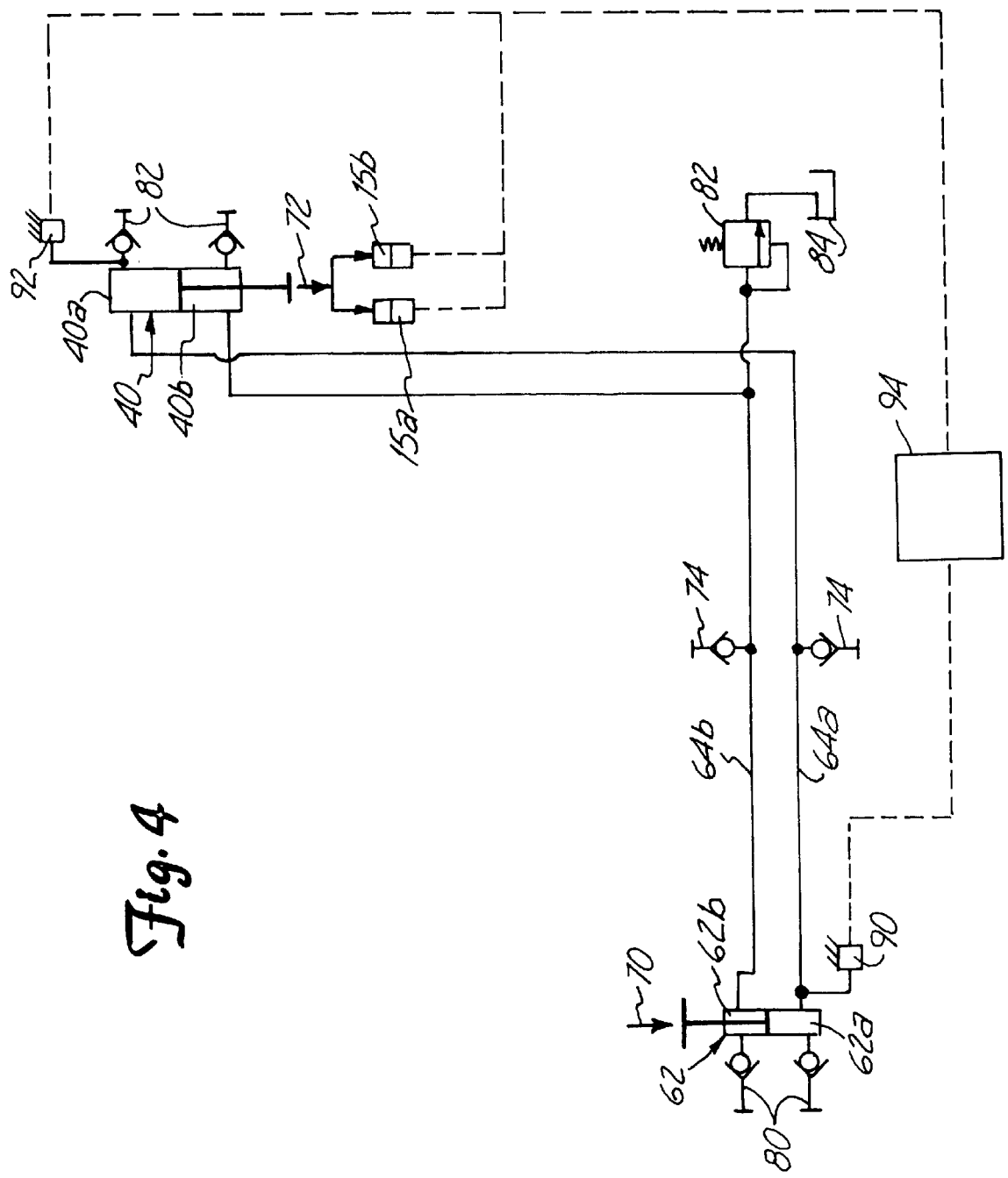
FIG. 4 is a schematic illustration of a hydraulic fluid flow path in the belt scale calibration system.

A preferred hydraulic system for operably connecting the load induced cylinder 62 and the load inducing cylinder 40 is depicted in FIG. 4. A high pressure hydraulic fluid line 64a operably connects a high pressure region 62a of the load induced cylinder 62 with a high pressure region 40a of the load inducing cylinder 40. Similarly, a low pressure hydraulic fluid line 64b operably connects a low pressure region 62b of the load induced cylinder 62 with a low pressure region 40b of the load inducing cylinder 40.

Placing a load on the load induced cylinder 62 moves the cylinder downwardly, as indicated by arrow 70, and causes hydraulic fluid to flow from the high pressure region 62a of the load induced cylinder 62 through the high pressure hydraulic fluid line 64a. The hydraulic fluid then flows into the high pressure region 40a of the load inducing cylinder 40 to cause the cylinder to move downwardly, as indicated by arrow 72. Downward movement of the load inducing cylinder 40 causes hydraulic fluid to flow from the low pressure region 40b of the load inducing cylinder 40 through the low pressure hydraulic fluid line 64b. The hydraulic fluid then flows into the low pressure region 62b of the load induced cylinder 62.

The hydraulic system preferably includes system fill disconnect valves 74 on the high and low pressure hydraulic fluid lines 64a, 64b for filing the high and low pressure hydraulic fluid lines 64a, 64b with hydraulic fluid. The load induced cylinder 62 and the load inducing cylinder 40 each include hydraulic fluid bleed disconnects 80, 82 for bleeding air from the high and low pressure hydraulic fluid lines 64a, 64b, respectively.

The high pressure hydraulic fluid line 64a also preferably includes a pressure relief valve 84 to protect the high pressure hydraulic fluid line 64a from damage caused by excessive pressure on the load induced cylinder 62. A hydraulic fluid collection pan 86 is provided adjacent to the pressure relief valve 84 to collect any hydraulic fluid that passes through the pressure relief valve 84.

A person of ordinary skill in the art will appreciate that a variety of techniques may be used for charging the hydraulic system without departing from the present invention. Once the hydraulic system is charged, the belt scale calibration system is calibrated with a zero weight adjustment mechanism using techniques that are known in the art.

The belt scale calibration system 10 further includes a control system that monitors the operation of the belt scale calibration system 10. The control system includes pressure transducers 90, 92 that monitor the pressure of the hydraulic fluid in the high pressure hydraulic fluid line 64a proximate to the load induced cylinder 62 and the load inducing cylinder 40, respectively. The pressure transducers 90, 92 are operably connected to a system controller 94. The system controller 94 is also operably connected to pressure transducers attached to the belt scale load cells 15*a*, 15*b*. When using the control system, it is possible to compare the pressure reading on the belt scale 12 with the pressure reading from the control system.

An advantage of using the belt scale calibration system 10 of the present invention is that relatively light weights placed on the load induced cylinder 62 produce relatively large forces from the load inducing cylinder 40 so that it is not necessary to use test materials in a weight that approximates the weight of the bulk materials passing, over the belt scale 12. Additionally, the weight placed on the load induced cylinder 62 may be varied to calibrate the belt scale 12 at an infinite number of loadings without the need to have large amounts of test equipment that must be transported between testing locations.

The control system may be programmed to make comparisons between individual tests as well as to make adjustments to the load cells of the belt scale 12 when the load cells need to be readjusted.

The belt scale calibration system 10 may also be adapted to include the ability to evaluate whether the load cells in the belt scale 12 are properly aligned as well as whether the rollers 44 are properly aligned. When these features are desired, sensors are added to the control system to monitor force placed upon the individual rollers 44. For example, the force on the front rollers 44*a*, the back rollers 44*b*, and the intermediate rollers 44*c*, which are most clearly illustrated in FIG. 1, may be monitored. Similarly, the force on the center roller 44*d* and outside rollers 44*e*, 44*f*, which are most clearly illustrated in FIG. 2, may also be monitored.

To further enhance the accuracy of the belt scale calibration system 10 of the present invention at simulating the actual loading of bulk material on the conveyor belt 14, the belt scale calibration system 10 may include a second load inducing system 110, as most clearly illustrated in FIG. 5. The second load inducing system 110 is preferably located on the conveyor belt 14 proximate to where the bulk material is placed on the conveyor belt 14. The second load inducing system 110 preferably has a structure that is substantially identical to the embodiment illustrated in FIGS. 1–4. In particular, the second load inducing system 110 includes a second support assembly 122 and a second load inducing assembly 120 that engages the conveyor belt 14. The second load inducing system 110 also includes a second load induced assembly 160. Varying, the amount of weight placed on the second load induced assembly 160 varies the amount of force applied to the conveyor belt 14 and thereby varies the drag placed on the conveyor belt 14.

A difference with the second load inducing system 110 is that the load placed on the conveyor belt 14 is not used to calibrate a belt scale but rather is used to place a force on the conveyor belt 14 that simulates loading of the conveyor belt 14 with bulk material. A person of ordinary skill in the art will appreciate that it is also possible to use other load inducing system at other locations on the conveyor belt 14 to further enhance the accuracy of the present invention at simulating loading of the belt scale 12 with bulk material.

Although the present invention has been described with reference to preferred embodiments, workers skilled in the art will recognize that changes may be made in form and detail without departing from the spirit and scope of the invention.

What is claimed is:

1. A belt scale calibration system for calibrating a belt scale that is mounted with respect to a conveyor belt, wherein the conveyor belt is movable in a machine direction, the belt scale calibration system comprising:

a load inducing assembly including a load inducing hydraulic cylinder and positioned to engage the conveyor belt proximate to the belt scale;

a mounting frame mounted with respect to the conveyor belt, wherein the load inducing hydraulic cylinder is attached to the mounting frame; and a load induced assembly operably connected to the load inducing assembly, wherein applying a first force to the load induced assembly produces a second force on the load inducing assembly, and wherein the load inducing assembly transmits the second force to the conveyor belt for calibrating the belt scale.

2. The belt scale calibration system of claim 1, and wherein the mounting assembly further comprises:

a retraction mechanism that moves the mounting frame from an engaged position to a retracted position, wherein the load inducing assembly engages the conveyor belt proximate to the belt scale when the mounting frame is in the engaged position.

3. The belt scale calibration system of claim 2, wherein the load inducing assembly comprises:

a support frame attached to the load hydraulic inducing cylinder opposite the mounting frame; and a plurality of rollers rotatably attached to the support frame so that the rollers engage the conveyor belt proximate to the belt scale when the mounting frame is in the engaged position.

4. The belt scale calibration system of claim 3, wherein the plurality of rollers includes a front roller and a back roller, wherein the front roller and the back roller are aligned in series along the machine direction so that the front roller is positioned prior to the belt scale and the back roller is positioned after the belt scale.

5. The belt scale calibration system of claim 4, wherein the plurality of rollers further includes at least one intermediate roller, and wherein the intermediate roller is aligned in series along the machine direction between the front roller and the back roller.

6. The belt scale calibration system of claim 3, wherein the plurality of rollers includes a center roller and a pair of outside rollers, and wherein the center roller and the outside rollers are aligned in series along the machine direction so that the center roller is between the outside rollers.

7. The belt scale calibration system of claim 3, wherein the load induced cylinder is operably connected to the load inducing hydraulic cylinder, and wherein the second force is proportionately larger than the first force.

8. The belt scale calibration system of claim 7, wherein the load induced cylinder is a hydraulic cylinder, and wherein the load induced cylinder and the load inducing cylinder are operably connected with a hydraulic line.

9. The belt scale calibration system of claim 3, and further comprising a control system that comprises:

a pressure transducer that measures the pressure applied by the load inducing cylinder; and a system controller operably connected to the pressure transducer.

10. The belt scale calibration system of claim 9, wherein the control system further comprises a pressure transducer attached to the belt scale and operably connected to the system controller.

11. A belt scale calibration system for calibrating a belt scale on a conveyor belt, the belt scale calibration system comprising:
  a support assembly mounted with respect to the conveyor belt;
  a load inducing assembly comprising:
    a load inducing cylinder attached to the support assembly;
    a support frame attached to the load inducing cylinder opposite the support assembly; and
    a plurality of rollers rotatably attached to the support frame, wherein the cylindrical rollers engage the conveyor belt proximate to the belt scale;
  a load induced assembly comprising a load induced cylinder; and
  a hydraulic line operably connecting the load induced cylinder with the load inducing cylinder, wherein applying a first force to the load induced cylinder produces a second force on the load inducing cylinder, and wherein the load inducing cylinder transmits to the conveyor belt for calibrating the belt scale.

12. The belt scale calibration system of claim 11, wherein the plurality of rollers includes a front roller and a back roller, wherein the front roller and the back roller are aligned in series along the machine direction so that the front roller is positioned prior to the belt scale and the back roller is positioned after the belt scale.

13. The belt scale calibration system of claim 12, wherein the plurality of rollers further includes at least one intermediate roller, and wherein the intermediate roller is aligned in series along the machine direction between the front roller and the back roller.

14. The belt scale calibration system of claim 12, wherein the plurality of rollers includes a center roller and a pair of outside rollers, and wherein the center roller and the outside rollers are aligned in series alone the machine direction so that the center roller is between the outside rollers.

15. The belt scale calibration system of claim 11, wherein the load induced cylinder is operably connected to the load inducing cylinder, and wherein a force applied to the load induced cylinder produces a proportionately larger force on the load inducing cylinder.

16. The belt scale calibration system of claim 11, and further comprising a control system that comprises:
  a pressure transducer that measures the pressure applied by the load inducing cylinder; and
  a system controller operably connected to the pressure transducer.

17. The belt scale calibration system of claim 16, wherein the control system further comprises a pressure transducer attached to the belt scale and operably connected to the system controller.

18. A belt scale calibration system for calibrating a belt scale on a conveyor belt, the belt scale calibration system comprising:
  a first load inducing assembly mounted with relation to the conveyor belt proximate to the belt scale and including a first load inducing hydraulic cylinder;
  a first load induced assembly operably connected to the first load inducing assembly and including a first load induced hydraulic cylinder;
  a second load inducing assembly mounted with relation to the conveyor belt and including a second load inducing hydraulic cylinder; and
  a second load inducing assembly operably connected to the second load inducing assembly, wherein applying a first force and a second force to the first load induced assembly and the second load induced assembly, respectively, and wherein the first load induced assembly and the second load induced assembly transmit the first force and the second force to the first load inducing assembly and the second load inducing assembly, respectively, for applying a load to the conveyor belt for calibrating the belt scale.

19. The belt scale calibration system of claim 18, wherein the first load inducing hydraulic cylinder and the first load induced hydraulic cylinder are operably connected with a first hydraulic line, and wherein the second load inducing hydraulic cylinder and the second load induced hydraulic cylinder are operably connected with a second hydraulic line.

20. The belt scale calibration system of claim 19, and further comprising a control system that comprises:
  a first pressure transducer that measures the pressure applied by the first load inducing cylinder;
  a second pressure transducer that measures the pressure applied by the second load inducing cylinder; and
  a system controller operably connected to the first pressure transducer and the second pressure transducer.

* * * * *

UNITED STATES PATENT AND TRADEMARK OFFICE
CERTIFICATE OF CORRECTION

PATENT NO. : 5,900,591
DATED : MAY 4, 1999
INVENTOR(S) : GARY M. LIUBAKKA

It is certified that error appears in the above-identified patent and that said Letters Patent is hereby corrected as shown below:

Title Page, [56], References Cited, after, U.S. PATENT DOCUMENTS, INSERT- -

| | | | |
|---|---|---|---|
| 2,974,518 | 03/ /1961 | Jones | 73/1 |
| 3,194,050 | 07/ /1965 | Ruge | 73/1 |
| 3,396,573 | 08/ /1968 | Blubaugh | 73/1 |
| 3,636,750 | 01/ /1972 | Wojcik | 73/1B |
| 3,656,337 | 04/ /1972 | McDonald | 73/1B |
| 3,850,023 | 11/ /1974 | McDonald | 73/1B |
| 3,976,150 | 08/ /1976 | Wilson et al. | 117/16 |
| 4,090,393 | 05/ /1978 | Kharitonov et al. | 73/1B |
| 4,309,896 | 01/ /1982 | Laurent | 73/1B |
| 4,658,921 | 04/ /1987 | Karpa | 117/50 |
| 4,848,478 | 07/ /1989 | Hafner | 117/50-- |

Column 7, line 37, delete "in series alone the", insert --in series along the--

Signed and Sealed this

Thirtieth Day of November, 1999

Attest:

*Attesting Officer*

Q. TODD DICKINSON

*Acting Commissioner of Patents and Trademarks*